United States Patent

Toda

[11] Patent Number: 5,098,032
[45] Date of Patent: Mar. 24, 1992

[54] SPINNING REEL

[75] Inventor: Junichi Toda, Sakai, Japan

[73] Assignee: Shimano Corporation, Osaka, Japan

[21] Appl. No.: 517,748

[22] Filed: May 2, 1990

Related U.S. Application Data

[62] Division of Ser. No. 195,909, May 19, 1988, Pat. No. 4,938,433.

[30] Foreign Application Priority Data

| May 23, 1987 | [JP] | Japan | 62-77882 |
| Sep. 9, 1987 | [JP] | Japan | 62-138499 |
| Sep. 11, 1987 | [JP] | Japan | 62-139885 |
| Dec. 24, 1987 | [JP] | Japan | 62-197032 |

[51] Int. Cl.⁵ ............. A01K 89/027; A01K 89/01
[52] U.S. Cl. ............... 242/245; 242/246; 242/224
[58] Field of Search ............ 242/223, 244, 245, 246

[56] References Cited

U.S. PATENT DOCUMENTS

| 2,865,662 | 12/1958 | Nurmse | 242/318 |
| 3,979,082 | 9/1976 | Morishita | 242/318 |
| 4,327,880 | 5/1982 | Dorbandt | 242/318 |
| 4,391,419 | 7/1983 | Iwama et al. | 242/245 |
| 4,466,580 | 8/1984 | Toda | 242/245 |
| 4,516,741 | 5/1985 | Hashimoto | |
| 4,535,953 | 8/1985 | Omori | 242/318 |
| 4,555,072 | 11/1985 | Hitomi | 242/245 |
| 4,601,437 | 7/1986 | Yoshikawa | 242/245 |
| 4,650,161 | 3/1987 | Kaneko | 242/246 |
| 4,651,945 | 3/1987 | Ruin | 242/318 |
| 4,702,431 | 10/1987 | Kaneko | 242/246 |
| 4,702,432 | 10/1987 | Kaneko et al. | 242/246 |
| 4,732,344 | 3/1988 | Maruyama et al. | 242/246 |
| 4,804,150 | 2/1989 | Takeuchi | 242/245 |
| 4,899,953 | 2/1990 | Toda | |
| 4,930,722 | 6/1990 | Toda | 242/245 |
| 4,930,723 | 6/1990 | Toda | 242/223 X |
| 4,938,433 | 7/1990 | Toda | 242/246 |

FOREIGN PATENT DOCUMENTS

3147209A1 11/1981 Fed. Rep. of Germany.
2179753A 3/1987 United Kingdom.

Primary Examiner—Katherine Matecki
Attorney, Agent, or Firm—Dickstein, Shapiro & Morin

[57] ABSTRACT

A spinning reel is provided with a drag mechanism which includes an adjuster and a braking force measuring mechanism for measuring the braking force set by the drag mechanism. The reel also includes a reference position setting mechanism which specifies the position of the adjuster corresponding to the reference position at which an optimum force is set by the drag mechanism is obtained.

1 Claim, 8 Drawing Sheets

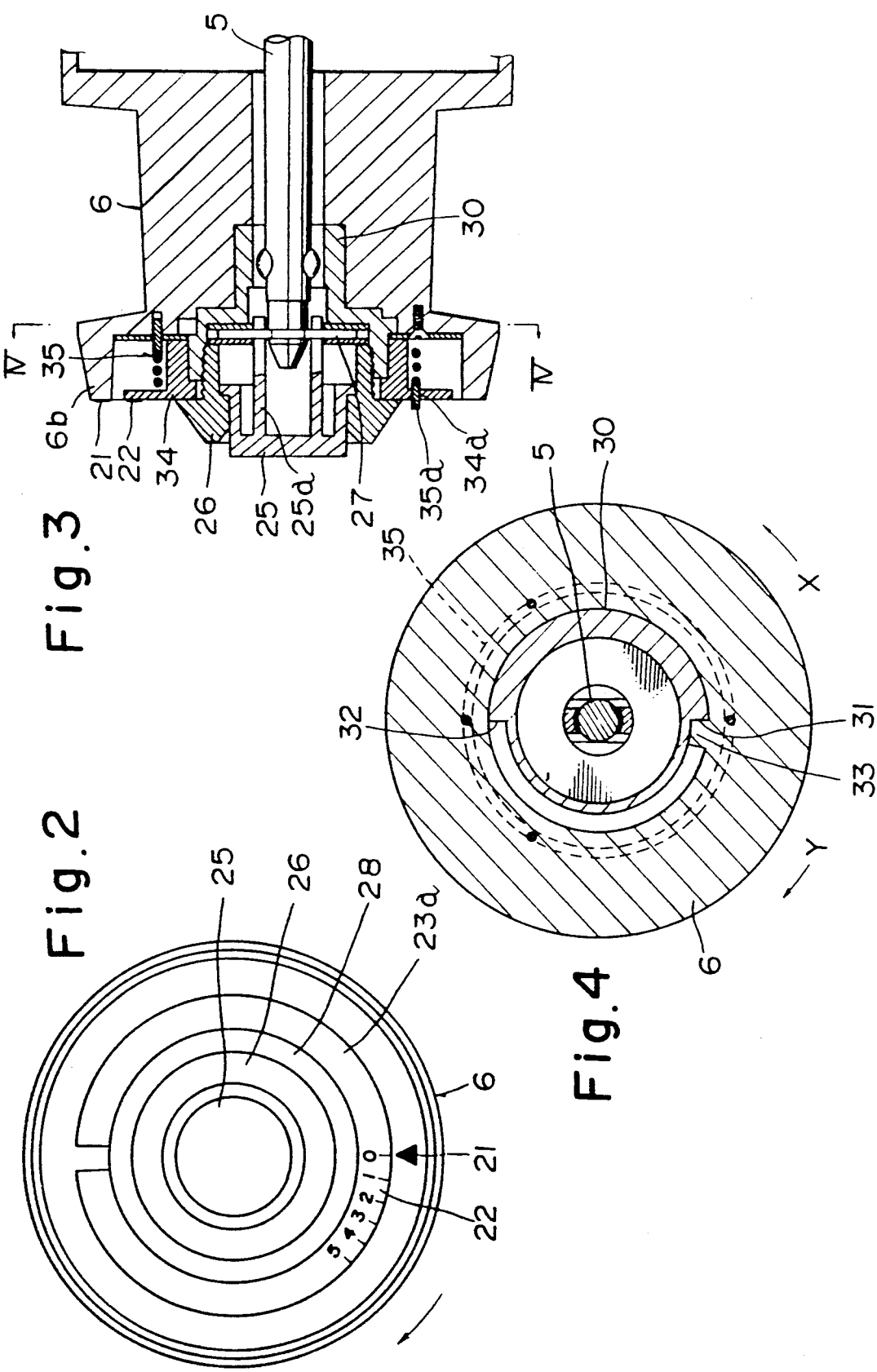

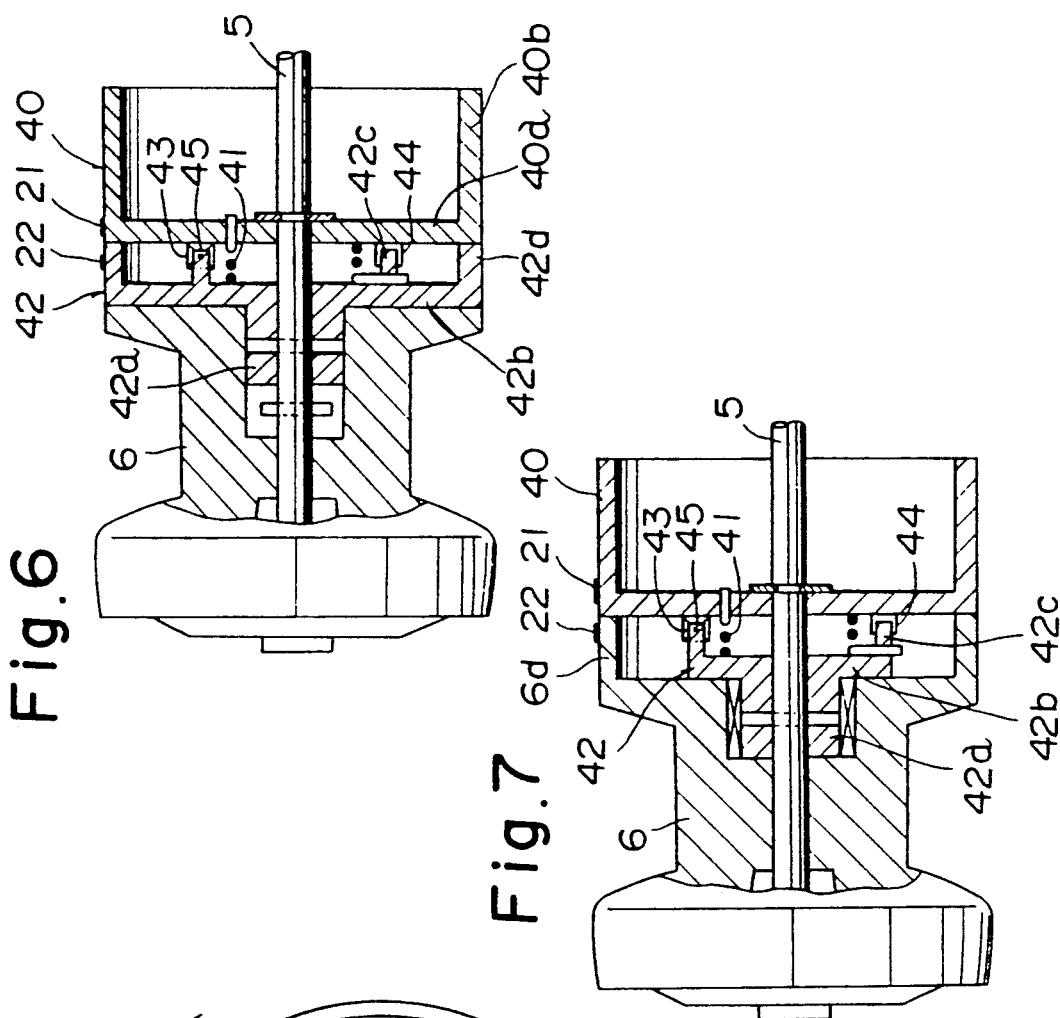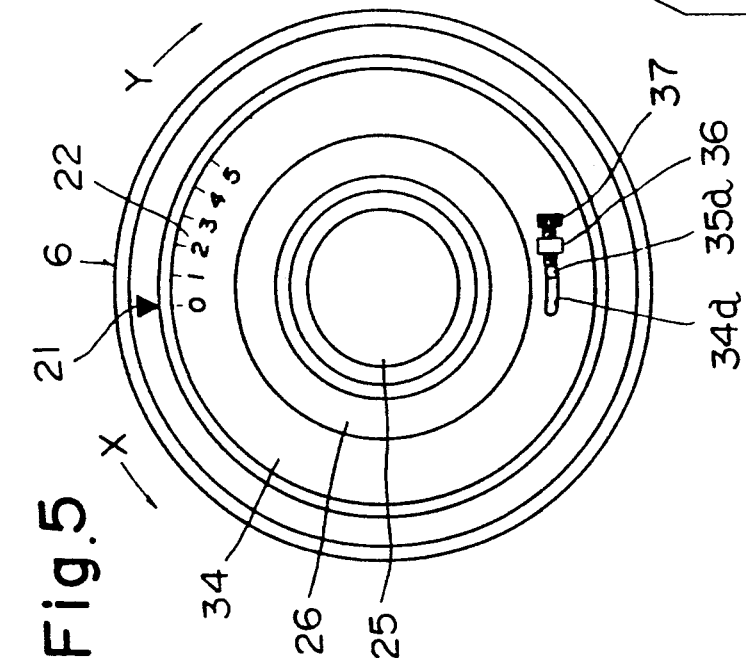

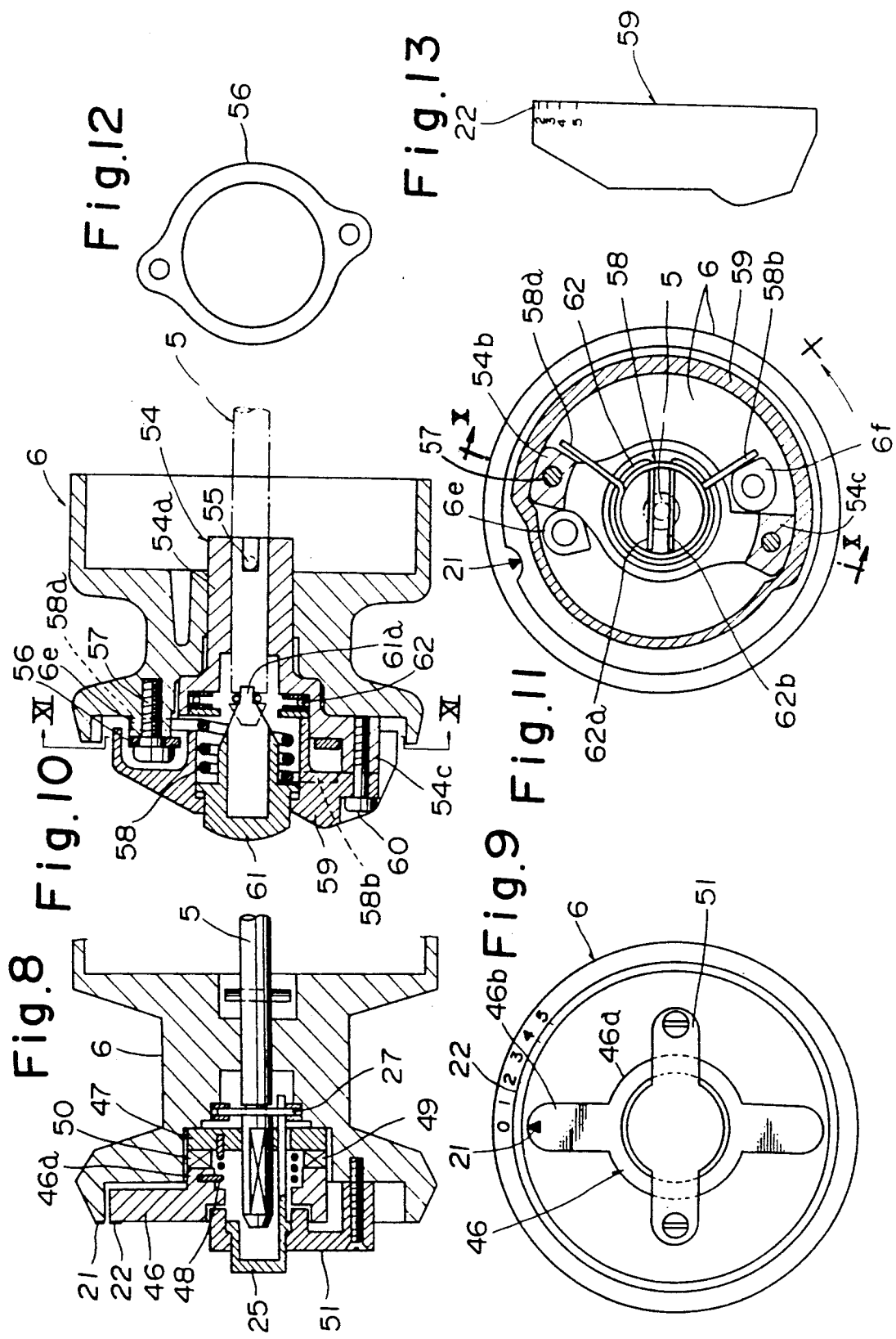

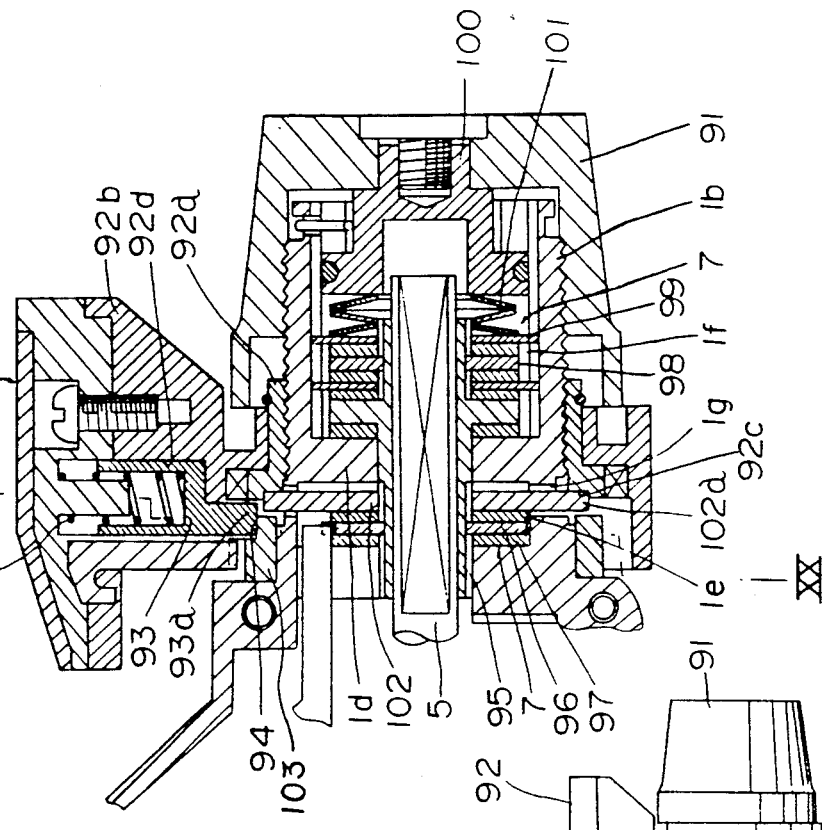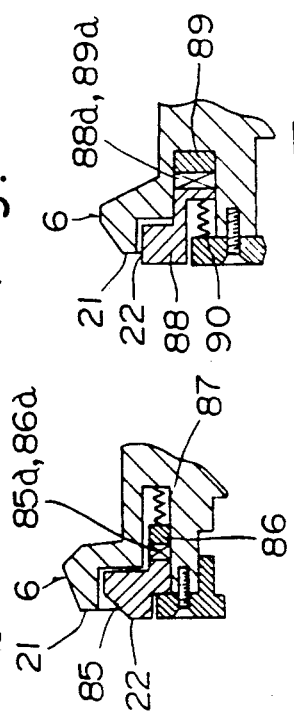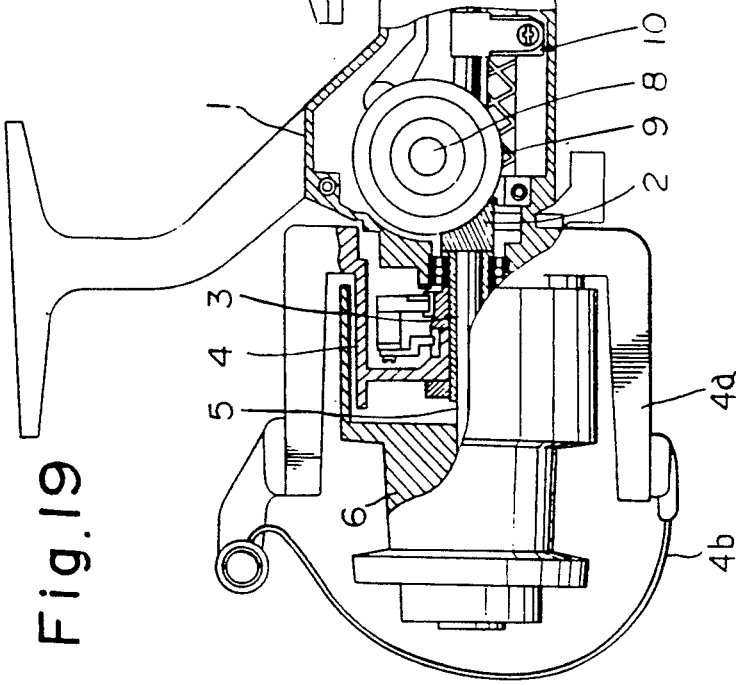

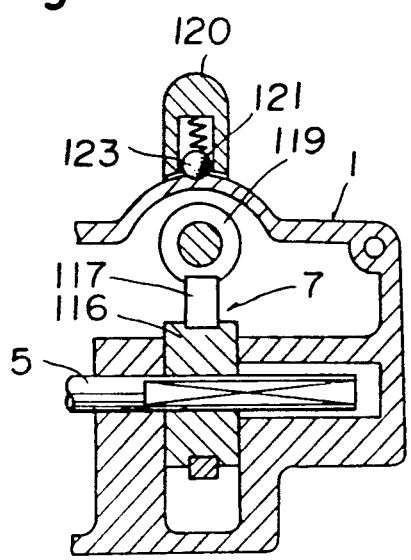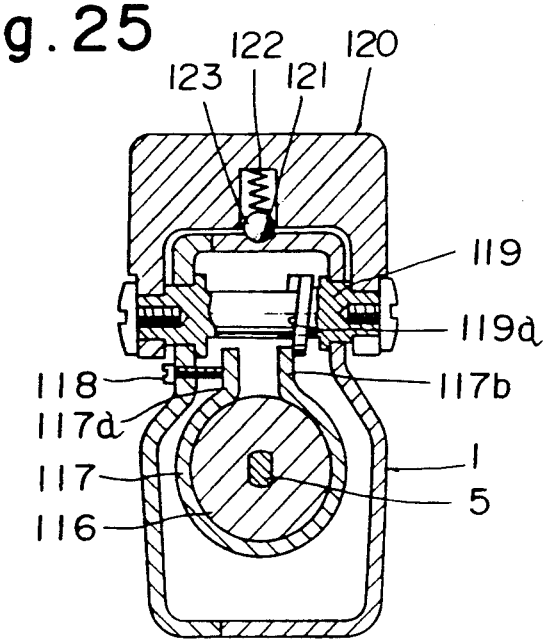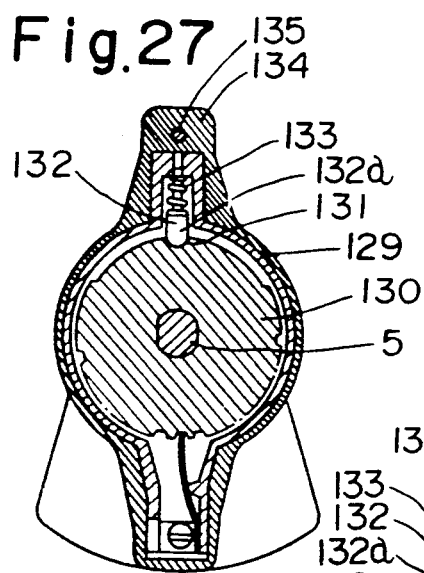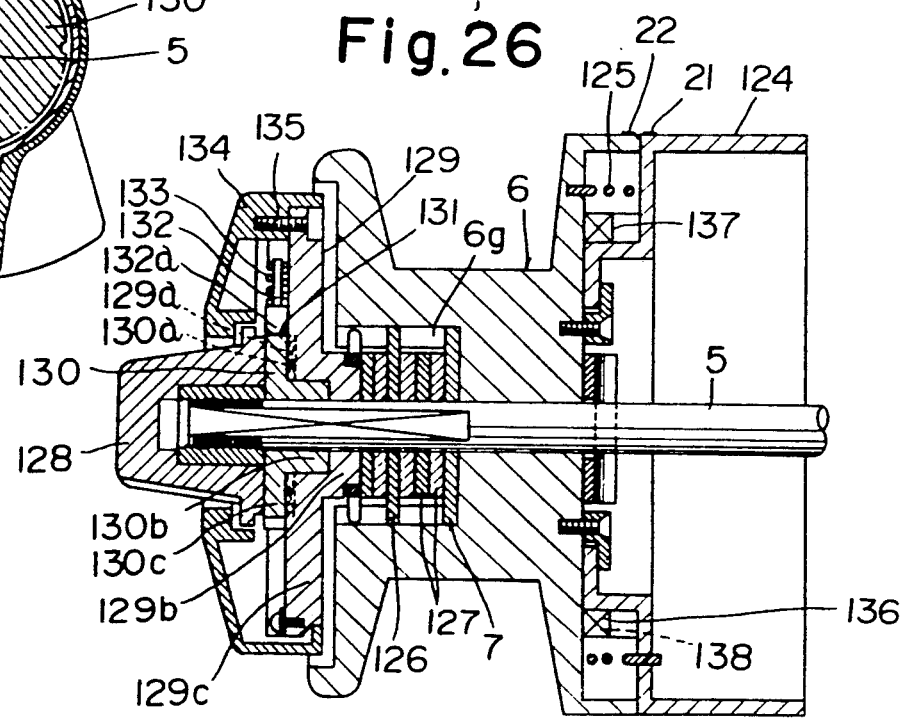

SPINNING REEL

This application is a division of application Ser. No. 195,909, filed May 19, 1988, now U.S. Pat. No. 4,938,433.

FIELD OF THE INVENTION

The present invention relates to a spinning reel, and more particularly, to a spinning reel provided with a spool and a rotary frame for winding a fishing line onto the spool.

BACKGROUND OF THE INVENTION

Generally, a fishing reel, as disclosed in Japanese Utility Model Application Gazette No. Sho 60-168375, includes a spool rotatably supported to a reel body for winding thereon a fishing line and a drag mechanism applying a braking force against rotation of the spool. A rotary adjuster is provided at the drag mechanism to an adjust a braking force applied thereby, to enable the drag mechanism to exert a predetermined braking force against rotation of the spool.

The braking force of the drag mechanism is preset to an optimum value by rotating the adjuster corresponding to a target fish and can be increased or decreased during fishing.

The conventional fishing reel, however, has no display for indicating the intensity of the braking force setting of the drag mechanism, whereby a problem is created in that an angler cannot check whether he has set an accurate optimum braking force of the drag mechanism corresponding to the target fish.

When angling the same kind of fish, it would be desirable to be able to put the adjuster in the position at which the optimum braking force is obtained for fishing. The adjuster, however, during fishing is rotatably adjustable from the position where the braking force is minimum to that where it is maximum. It is difficult to return the adjuster to the optimum adjusting position with accuracy after the adjuster has been operated corresponding to a hooked fish. Accordingly, even when the angler intends to angle the same kind of fish having approximately equal pulling forces when hooked, the adjuster changes in position every time a fish is hooked, thereby creating a problem in that a proper braking force cannot readily be obtained.

SUMMARY OF THE INVENTION

An object of the invention is to provide a spinning reel in which a braking force of a drag mechanism preset corresponding to a target fish can be reliably measured and checked, and an adjuster can be put in the position at which an optimum braking force is always obtainable and restored with accuracy to the optimum position even after adjusting the braking force therefrom.

The spinning reel of the invention is provided with a reel body, a spool, a spool shaft, a rotary frame rotatably supported to the reel body for winding a fishing line on the spool, a drag mechanism which applies a braking force against rotation of the spool and which is provided with an adjuster to adjust the braking force; and a braking force measuring mechanism for measuring the braking force set by the drag mechanism. The measuring mechanism is provided with an elastic member interposed between a braking force acting member subjected to the braking action by the drag mechanism and a rotary member rotatable with respect to the braking force acting member, a pointer provided at one of the braking force acting member and a rotary member, and a display provided at the other of the braking force acting member and the rotary member and displaying the braking force of the drag mechanism corresponding to the pointer. The reel according to the invention also includes a reference position setting mechanism which sets the reference position at which the braking force adjusted by the drag mechanism is optimum and which is provided with a reference portion for setting the reference position and a position specifying portion for specifying the position of the adjuster corresponding to the reference portion.

The present invention is characterized in that the spinning reel provided with a drag mechanism has both a braking force measuring mechanism for measuring the braking force set by the drag mechanism and a reference position setting mechanism for setting the reference position at which the braking force adjusted by the drag mechanism becomes optimum. The combination of both of these mechanisms yields the following advantages.

The optimum braking force set by the drag mechanism through operation of the adjuster for fishing can be measured by rotating the rotary member which is rotatable with respect to the braking force member against the elastic member. When an elastic restoring force of the elastic member is larger than a force equivalent to the braking force of the drag mechanism, the braking force acting member rotates together with the rotary member so that the display coincident with the pointer at the location at which the above members rotate together is read so as to reliably check an accurate braking force of the drag mechanism. After the braking force is checked, a reference portion at the reference position specifying mechanism is allows to coincide with a position specifying portion thereof, thereby enabling the reference position of the optimum braking force to be specified. Also, even when the braking force is adjusted to increase or decrease with respect to the reference position, the adjuster can be returned to the position at which the position specifying portion coincides with the reference portion, thereby being readily and accurately restored to the reference position at which the optimum braking force is obtained.

The above and further objects and novel features of the invention will be more fully apparent from the following detailed description when the same is read in connection with the accompanying drawings.

BRIEF DESCRIPTION OF THE DRAWINGS

FIG. 2 is a side view of a spool only;

FIGS. 3 to 5 show a second embodiment of the invention in which,

FIG. 3 is a longitudinal sectional view of a part including a spool;

FIG. 4 is a sectional view taken along line IV—IV in FIG. 3; and

FIG. 5 is a side view of the spool, corresponding to FIG. 2;

FIG. 6 is a longitudinal sectional view of a third embodiment of the invention, showing a part including a spool;

FIG. 7 in a longitudinal sectional view of a fourth embodiment of the invention, showing a part including a spool;

FIG. 8 is a longitudinal sectional view of a fifth embodiment of the invention, showing a part including a spool;

FIG. 9 is a left side view of the fifth embodiment in FIG. 8;

FIG. 10 is a longitudinal sectional view of a sixth embodiment of the invention, showing a part including a spool;

FIG. 11 is a sectional view taken along line XI—XI in FIG. 10;

FIG. 12 is a plan view of a holder plate only in the sixth embodiment;

FIG. 13 is a side view of a holder only in the sixth embodiment;

FIGS. 17 and 18 are partial sectional views of a ninth embodiment of the invention, showing the principal portions only;

FIG. 19 is a partial cutaway front view of a tenth embodiment of the invention;

FIG. 20 is a longitudinal sectional view of a drag mechanism only provided at the rear portion of the reel body;

FIG. 24 is a longitudinal sectional view of a twelfth embodiment of the invention, corresponding to FIG. 20;

FIG. 25 is a sectional view of an adjuster and a drag member in FIG. 24;

FIG. 26 is a longitudinal sectional view of a thirteenth embodiment of the invention, showing a part including a spool, and FIG. 27 is a sectional view of a position specifying member and a transmitting member in FIG. 26.

DETAILED DESCRIPTION OF THE INVENTION

Figure 1:
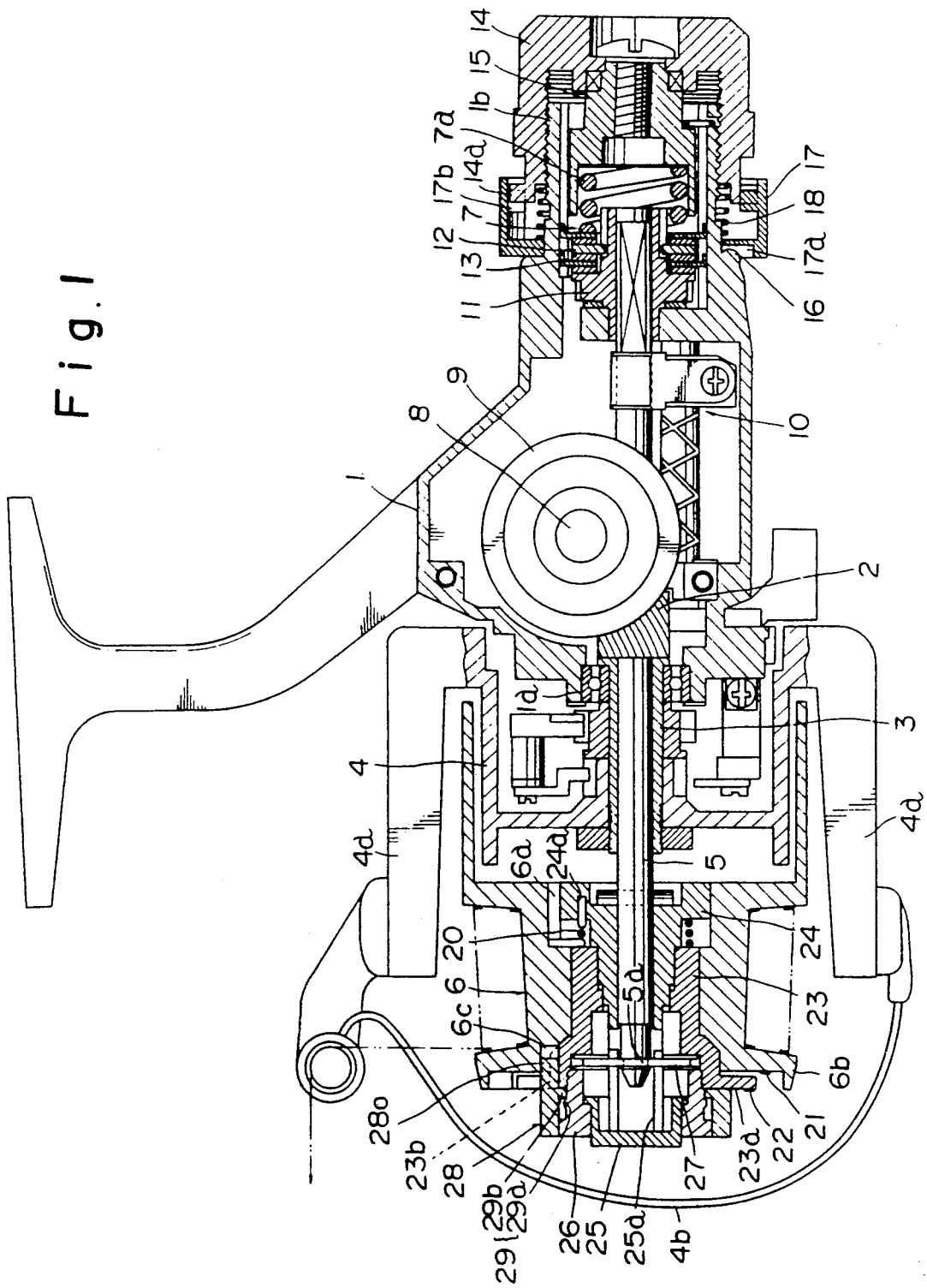
FIG. 1 is a partial longitudinal sectional front view of a first embodiment of a spinning reel of the invention.

A first embodiment of a spinning reel of the invention shown in FIGS. 1 and 2 is provided at the rear side of a reel body 1 with a drag mechanism 7. The spinning reel is basically constructed such that a tubular drive shaft 3 having a pinion 2 is supported rotatably through a bearing 1a to a through bore provided at a front wall of reel body 1. A rotary frame 4 having a cylindrical portion and a pair of support arms 4a is mounted on the outer periphery of the fore end of drive shaft 3. A spool shaft 5 is supported into a shaft bore at drive shaft 3 to be rotatable and axially movable and supports at its fore end a spool 6. A drag mechanism 7 applying a braking force against rotation of spool shaft 5 is provided between the rear end of spool shaft 5 which projects into reel body 1 and the rear portion of reel body 1. A handle shaft 8 extending perpendicularly relative to the axis of drive shaft 3 is rotatably supported to reel body 1 through a bearing (not shown). A master gear 9 engageable with pinion 2 is provided at the projection of handle shaft 8 entering into reel body 1. A handle (not shown) is provided at an externally projecting portion of handle shaft 8. Handle 8 is rotated to drive drive shaft 3 so as to rotate rotary frame 4. Spool 6 and spool shaft 5 are axially moved through a reciprocation mechanism 10 so as to guide a fishing line onto spool 6 through a bail arm 4b supported between support arms 4a at rotary frame 4, thereby winding the fishing line onto spool 6.

At the rear wall of reel body 1 are provided a through bore and a support cylinder 1b extending rearwardly from around the through bore, so that a rotary cylinder 11 is supported rotatably only into the through bore and spool shaft 5 is fitted at the rear end thereof into rotary cylinder 11 to be non-rotatable and axially movable relative thereto.

Drag mechanism 7 comprises a plate-like drag member 12 at the spool shaft side and plate-like drag members 13 at the support cylinder side, interposed between rotary cylinder 11 and support cylinder 1b, and a cylindrical adjuster 14 screwable with support cylinder 1b. Drag mechanism 7 also includes pusher 15 mounted position-adjustably to adjuster 14, and a drag spring 7a interposed between pusher 15 and drag member 13. Adjuster 14 is rotatably operated to bring drag members 12 and 13 into press contact with each other, thereby exerting braking action on rotary cylinder 11 and in turn on spool shaft 5.

In the first embodiment shown in FIGS. 1 and 2, spool 6 is rotatable with respect to spool shaft 5 which is subjected to the braking action by drag mechanism 7, and an elastic member 20 comprising a coil spring is interposed between spool 6 and spool shaft 5 and in turn a spool holder 24 to be discussed below. A pointer 21 is provided at spool 6, and a scale display 22 corresponding to pointer 21 and displaying the intensity of the braking force of drag mechanism 7 is provided at spool holder 23 mounted on spool shaft 5. Elastic member 20, pointer 21 and display 22 constitute a braking force measuring mechanism. Also, at one side surface of the rear portion of reel body 1 is provided a projecting reference portion 16 for setting the reference position at which the optimum braking force is set by adjuster 14, and a position specifying member 17 having a position specifying recess 17a which specifies the position of adjuster 14 corresponding to reference portion 16 is provided at adjuster 14 to be position-changeable with respect thereto. Reference portion 16 and position specifying portion 17a constitute a reference position setting mechanism. Hence, position specifying portion 17a coincides with reference portion 16 to enable adjuster 14 to be placed with accuracy in the optimum position.

In the above-described construction, two cylindrical spool holders 23 and 24 fixedly engageable with each other are supported non-rotatably relative to spool shaft 5, with spool 6 being rotatably supported onto the outer peripheries of spool holders 23 and 24. Spool holder 24 is provided with a retaining bore 24a, and spool 6 is provided at its inner surface with a retaining groove 6a. Elastic member 20 is retained at both ends to retaining bore 24a and retaining groove 6a respectively, so that the rotation of spool 6 is transmitted to spool shaft 5 through elastic member 20 and spool holders 23 and 24.

At the outer periphery of the front end portion of spool holder 23 is provided a flange 23a opposite to front side flange 6b of spool 6. Display 22 is provided at the surface of flange 23a, and pointer 21 is provided at the front surface of front side flange 6b.

A cylindrical holder 26 slidably holds an operating member 25 having rearwardly extending legs 25a and screws with the inner surface at the fore end portion of spool holder 23. Between holder 26 and spool holder 23 is interposed a ring spring 27 engageable with an annular retaining groove 5a at spool shaft 5. Ring spring 27 retains spool holders 23 and 24 to prevent them from moving axially with respect to spool shaft 5. Operating member 25 is pushed to expand ring spring 27 in diameter through legs 25a, thereby enabling spool holders 23 and 24 and spool 6 to be removed.

At the front end of spool 6 are provided a plurality of fitting grooves 6c circumferentially spaced at predetermined intervals. A lock member 28 having a fitting projection 28a insertable into one fitting groove 6c is supported axially movably on the outer periphery of holder 26, and one insertion groove 23b receiving therein fitting projection 28a is provided at the front end portion of spool holder 23. Lock member 28 is operated to fit fitting projection 28a into fitting groove 6c, thereby restraining spool 6 from rotating with respect to spool holder 23. Between lock member 28 and holder 26 is provided a positioning mechanism 29 for maintaining the operating position and non-operating position of lock member 28. Positioning mechanism 29 comprises a positioning projection 29a provided at the outer periphery of holder 26 and an engaging projection 29b projecting radially inwardly from the inner surface of lock member 28 and engageable with positioning projection 29a, so that lock member 28 is operated to allow engaging projection 29b to ride over positioning projection 29a so as to restrict lock member 28 from moving, thereby putting lock member 28 at an operating position at which fitting projection 28a is fitted into fitting groove 6c or a non-operating position at which the above fitting is released.

In addition, positioning mechanism 29 may maintain only the operation position of lock member 28 and be constructed to have alternative structure other than that illustrated as described above.

Reference portion 16 of the reference position setting mechanism is integral with the side surface at the rear portion of reel body 1, and position specifying portion 17a is provided at the front end surface of a position specifying member 17 having a cylindrical shape and rotatably supported on the outer periphery of the front end portion of adjuster 14. Between adjuster 14 and position specifying member 17 is interposed a compression spring 18 for biasing position specifying member 17 toward reference portion 16. Axially extending splines 14a and 17b, which are in engagement with each other when position specifying member 17 is biased, are circumferentially provided at adjuster 14 and position specifying member 17, so that position specifying member 17 rotates following the rotation of adjuster 14 and is moved against the bias of compression spring 18, thereby disengaging splines 14a and 17b from each other to enable position specifying member 17 to be rotatable relative to adjuster 14, i.e., to be position-changeable.

Prior to fishing with the spinning reel constructed as describe above, adjuster 14 is rotatably operated to preset the braking force of drag mechanism 7 to an optimum value corresponding to a target fish.

The preset optimum braking force can be measured and checked as follows: At first, lock member 28 is pulled to release spool 6 from spool holder 23 and then spool 6 is directly rotated or the fishing line wound thereon is pulled, whereby spool 6 rotates relative to spool shaft 5 in the direction of drawing out the line while overcoming the bias force of elastic member 20. When the elastic restoring force of elastic member 20 is larger than the force equivalent to the braking force set by the drag mechanism, spool shaft 5 rotates together with spool 6 overcoming the braking force applied by drag mechanism 7.

Display 22 is read via pointer 21 at the location at which spool shaft 5 rotates together with spool 6 to ensure measurement and check of the braking force of drag mechanism 7. Spool 6, when released, is rotatably restored by an elastic restoring force of elastic member 20.

Next, after the restoration of spool 6, lock member 28 is pushed to fit fitting projection 28a into fitting groove 6c, thereby restraining the rotation of spool 6 with respect to spool shaft 5 so as to make elastic member 20 non-operable and directly connecting spool 6 with spool shaft 5. Hence, during fishing spool 6 is prevented from rotating by virtue of tension acting on the line and by a force which is smaller than the braking force of drag mechanism 7 and caused by deflection of elastic member 20. In addition, lock member 28 is ensured to be maintained at the operating position at which fitting projection 28a is fitted into fitting groove 6c.

After the accurate braking force of drag mechanism 7 is confirmed, position specifying member 17 is rotated with respect to adjuster 14 and position specifying portion 17a coincides with reference portion 16, thereby specifying the reference position for adjuster 14 for the optimum braking force.

When an angler rotates adjuster 14 to adjust the braking force of the drag mechanism corresponding to a pulling force of a hooked fish, position specifying portion 17a is not coincident with reference portion 16, so that adjuster 14 is not placed in the reference position. However, after fishing, adjuster 14 is returned to the position at which position specifying portion 17a coincides with reference portion 16, whereby adjuster 14 can be readily and accurately returned to the reference position for obtaining the preset optimum braking force.

Accordingly, while desirably operating adjuster 14 corresponding to the pulling force of the hooked fish, the angler can readily and accurately return adjuster 14 to the aforesaid reference position. Hence, there is no need to readjust adjuster 14 to the position of obtaining the optimum braking force each time adjuster 14 is operated. As a result, the spinning reel of the invention is convenient for use and facilitates fishing. Also, position specifying portion 17a engages with reference portion 16 so as to prevent the braking force from being excessively reduced, thereby avoiding entanglement of the fishing line drawn out from spool 6. Also, when position specifying portion 17a engages with reference portion 16 through compression spring 18, sounds can be generated at the engaging portions, such that the angler can check by hearing the sounds whether adjuster 14 has returned to the reference position.

Alternatively, for example, as shown in a second embodiment in FIGS. 3 to 5, first and second regulation portions 31 and 32 for regulating a range of rotation of spool 6 with respect to spool shaft 5 are provided, instead of lock member 28, at a spool holder 30 supported non-rotatably relative thereto. Spool 6 is provided with an engaging portion 33 to abut against regulation portion 31 or 32, and between spool 6 and spool holder 30, and in turn a display member 34 fixed thereto, is provided an elastic member 35 in the form of a coil spring for biasing spool 6 in the direction of drawing out the line from spool 6. Engaging portion 33 engages with first regulation portion 31 to restrain spool 6 from rotating by elastic member 35 in the direction of drawing out the line.

In addition, in the second embodiment, a pointer 21 is provided at spool 6 and a display 22 is provided at display member 34. Display member 34, as shown in FIG. 5, is provided with an elongated slot 34a through which a spring end 35a of elastic member 35 passes, and with a support piece 36 having a threaded bore, so that an adjusting screw 37 to abut against spring end 35a screws with support piece 36, with adjusting screw 37 being operated to adjust the reaction force of elastic member 35.

In the second embodiment, components which are substantially the same in structure as those in the first embodiment are designated with the same reference numerals.

In the second embodiment, in order to check the braking force set by the drag mechanism, spool 6 is rotated with respect to spool shaft 5 in the reverse direction (in the direction of arrow X in FIGS. 4 and 5) to the direction of drawing out the line (in the direction of arrow X in FIGS. 4 and 5) against the elastic restoring force of elastic member 35. Hence, when the elastic restoring force of elastic member 35 becomes larger, due to rotation of spool 6, than the force equivalent to the braking force set by the drag mechanism, spool shaft 5 rotates together with spool 6 overcoming the braking force of the drag mechanism.

Scale display 22 is read via pointer 21 at the location at which spool shaft 5 rotates together with spool 6 to enable the angler to accurately and reliably determine the braking force of the drag mechanism.

After the above procedure of checking the braking force has been carried out, spool 6, as shown in FIG. 4, automatically returns in the direction of drawing out the fishing line by the elastic restoring force of elastic member 35, and engaging portion 33 of spool 6 engages with first regulation portion 31 of spool holder 30, thereby restraining spool 6 from further rotation in the fishing line drawing-out direction. As a result, spool 6 is prevented from rotating in the line drawing-out direction due to a pulling force of a hooked fish during fishing.

Alternatively, as shown in third and fourth embodiments in FIGS. 6 and 7, a rotary member 40 disposed oposite to the rear end of spool 6 may be rotatably supported to spool shaft 5, and spool 6 and a spring holder 42 supporting one end of an elastic member 41 may be mounted non-rotatably relative to spool shaft 5, whereby spring holder 42 may be subjected to braking action applied by the drag mechanism.

In detail, the third embodiment shown in FIG. 6, rotary member 40, which comprises a disc 40a and a cylindrical operating portion 40b projecting axially outwardly from the outer periphery of disc 40a, is rotatably supported relative to spool shaft 5 supporting spool 6 non-rotatably relative thereto. A spring holder 42 provided with a disc 42b having a mounting portion 42a and a smaller diameter ring 42c and a larger diameter ring 42d projecting axially outwardly from the intermediate portion and outer periphery of disc 42b respectively is mounted onto spool shaft 5 non-rotatably relative thereto. Elastic member 41 is interposed between smaller diameter ring 42c and disc 40a of rotary member 40, and a pointer 21 is provided at operating portion 40b of rotary member 40. A scale display 22 is provided at larger diameter ring 42d.

A fourth embodiment shown in FIG. 7 is provided at the outer periphery of the rear side flange of spool 6 with a ring 6d projecting axially outwardly and omits larger diameter ring 42d at spring holder 42 in FIG. 6, with scale display 22 being provided at ring 6d. In this embodiment, spool 6 and spring holder 42 serve as the members subjected to the braking action applied by the drag mechanism.

Also, in the third and fourth embodiments, between rotary member 40 and spring holder 42 are reported regulation portions 43 and 44 and an engaging portion 45 and elastic member 41 uses a coil spring for biasing spool 6 in the direction of drawing-out the fishing line.

In addition, in an embodiment in which rotary member 40 is used as the above-described rotating member and spool 6 non-rotatably mounted relative to spool shaft 5 is employed as the member subjected to the braking action, a rotary member member 46 may, as shown in FIGS. 8 and 9, be positioned opposite to the front end surface of spool 6.

In a fifth embodiment shown in FIGS. 8 and 9, a rotary member 46 comprising a cylindrical boss 46a and an operating portion 46b projecting radially outwardly therefrom and opposite to the front end surface of spool 6 is supported rotatably relative to spool shaft 5 non-rotatably supporting spool 6. A disc-like spool holder 47 is supported to the fore end portion of spool shaft 5 non-rotatably thereto. Between boss 46a and spring holder 47 are provided an elastic member 48 for biasing rotary member 46 in the direction of drawing out the fishing line and first and second regulation portions 49 and 50 and an engaging portion (not shown) the same as in the second embodiment. A pointer 21 is provided at operating portion 46b of rotary member 46, and a scale display 22 is provided at the front side flange of spool 6. In addition, in FIGS. 8 and 9, reference numeral 51 designates a holder for holding rotary member 46 to spool 6.

Alternatively, an elastic member 58 may be interposed between a spool holder 54 and spool 6 as shown in a sixth embodiment in FIGS. 10 and 11.

In the sixth embodiment shown in FIGS. 10 and 11, spool holder 54 provided with a cylinder 54a and a pair of retaining portions 54b and 54c projecting radially outwardly from the utmost end of cylinder 54 is supported to spool shaft 5 non-rotatably through a pin 55. Spool 6 is rotatably supported to cylinder 54a at spool holder 54. A pair of bosses 6e and 6f project from the front side surface of spool 6, and an annular presser plate 56 shown in FIG. 12 is fixed to each boss 6e or 6f through a bolt 57, with presser plates 56 mounting spool holder 54 to spool 6 to be rotatable but non-axially-movable relative thereto.

Elastic member 58 of a coil spring is interposed between retaining portion 54b at spool holder 54 and boss 6f of spool 6.

In other words, one spring end 58a of elastic member 58 is retained to one side of retaining portion 54b and the other spring end 58b to one side of boss 6f.

In addition, in FIGS. 10 and 11, reference numberal 59 designates a holder which slidably supports an operating member 61 fixed to spool holder 54 through a bolt 60. Holder 59, as shown in FIG. 13, is provided with a scale display 22 corresponding to a pointer 21 at spool 6.

Operating member 61 serves to make spool holder 54 mountable or dismountable by a simple one stroke operation onto or from spool shaft 5 and has a cam 61a for forcibly expanding engaging ends 62a and 62b of a holding spring 62 held to spool holder 54.

In the sixth embodiment, spool 6 is rotated in the direction of the arrow shown in FIG. 11, i.e., the fishing line (not shown) wound onto spool 6 is pulled to rotate spool 6, thereby enabling the braking force set by the drag mechanism to be measured.

In detail, when spool 6 rotates, elastic member 58 is deflected to increase the reaction force thereof, and when the reaction force exceeds the braking force set by the drag mechanism, spool shaft 5 rotates together with spool 6 overcoming the braking force.

At this time, relative rotation is eliminated between spool shaft 5 and spool 6, i.e., between spool 6 and holder 61 fixed to spool holder 54 which is supported to spool shaft 5 to be non-rotatable relative thereto, with the result that scale display 22 is not displaced from pointer 21. Accordingly, the position of scale display 22 coincident with pointer 21 is read to enable measurement of the braking force.

The aforesaid embodiments include a rotary member disposed at the front side of the reel body, with the rotary member being rotatable with respect to the member subjected to the braking action applied by the drag mechanism. Alternatively, as shown in a seventh embodiment in FIG. 14, the rotary member may be provided at the rear side of reel body 1.

Figure 14:
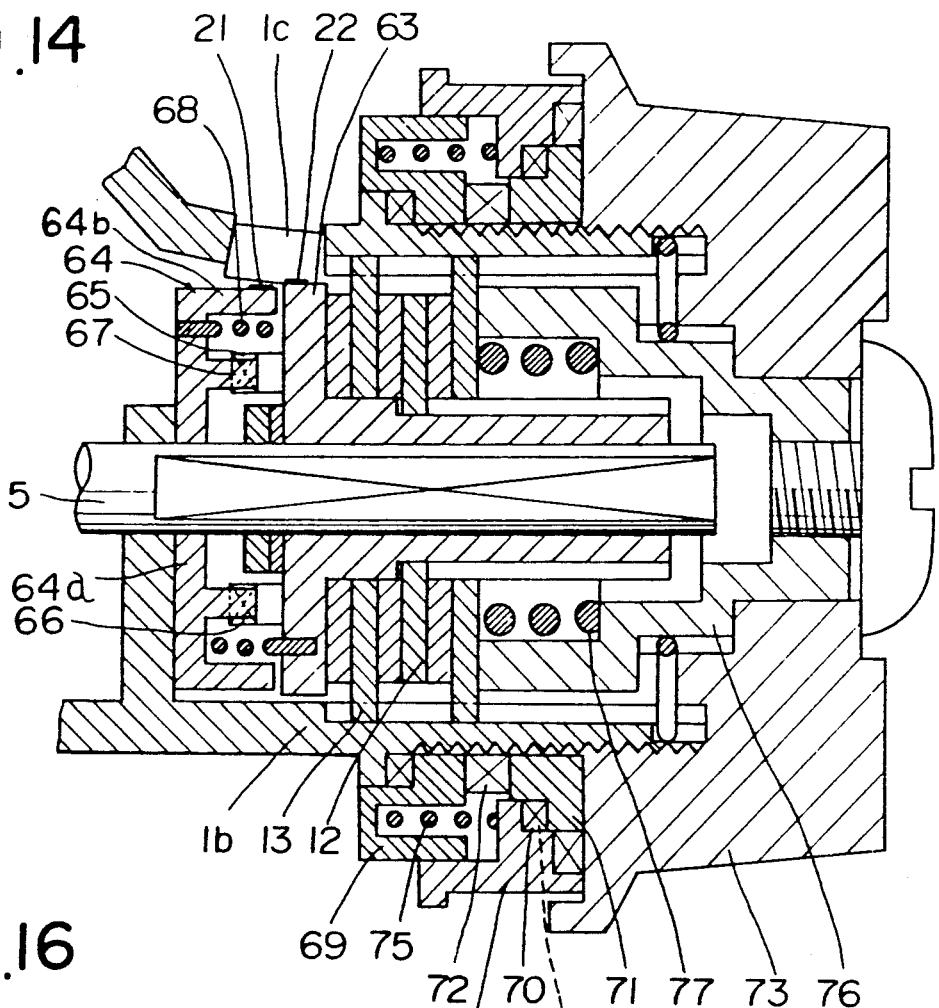
FIG. 14 is a longitudinal sectional view of a seventh embodiment of the invention, showing a drag mechanism provided at the rear portion of the reel body.
Figure 15:
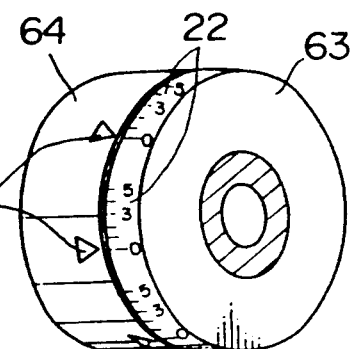
FIG. 15 is a perspective view of a rotary member and a drag cylinder in part taken out of the seventh embodiment.

In the seventh embodiment shown in FIG. 14, spool shaft 5 is supported rotatably and axially movably into a through bore provided at the rear side of reel body 1, and a drag cylinder 63 having a flange is supported rotatably to spool shaft 5. Between drag cylinder 63 and a support cylinder 1b are interposed drag members 12 and 13 the same as in FIG. 1 so that drag cylinder 63 serves as the member subjected to the braking action. A rotary member 64, comprising a disc 64a disposed opposite to the flange of the drag cylinder 63 and a ring 64b projecting axially outwardly from the outer periphery of disc 64a, is supported to spool shaft 5 non-rotatably relative thereto. First and second regulation portions 65 and 66, the same as in FIG. 4, are provided at one of rotary member 64 and drag cylinder 63, and an engaging portion 67 is provided at the other. Between rotary member 64 and drag cylinder 63 is provided an elastic member 68 formed of a coil spring for biasing rotary member 64 in the direction of drawing-out the line from spool 6 to thereby engage engaging portion 67 with first regulation portion 65. A plurality of pointers 21, as shown in FIG. 15, are provided at the outer periphery of ring 64b at rotary member 64 and circumferentially spaced at predetermined intervals. A plurality of scale displays 22, as shown in FIG. 15, are provided at the outer periphery of the flange of drag cylinder 63 and circumferentially spaced at predetermined intervals. A window 1c is provided at the root portion of support cylinder 1b so as to enable viewing of pointers 21 and scale displays 22 from the exterior through window 1c, so that spool 6 is directly rotated or the line wound on spool 6 is pulled to rotate spool 6, spool shaft 5 and rotary member 64 against elastic member 68 with respect to drag cylinder 63, thereby enabling the braking force to be checked.

In FIG. 14, a spool holder cylinder 69 is supported non-rotatably to the outer periphery of the root portion of support cylinder 1b, and a slide cylinder 71 having a reference portion 70 is slidably supported to the root portion of cylinder 1b. Between spring holder cylinder 69 and slide cylinder 71 is provided a fitting portion 72 which restrains slide cylinder 71 from rotating but permits it to slide. A position specifying member 74 having a position specifying 74a is provided position-changeably to an adjuster 73 screwing with support cylinder 1b, and a compression spring 75 is interposed between position specifying member 74 and spool holder cylinder 69. In addition, in FIG. 14, reference numeral 76 designates a pusher and 77 designates a drag spring.

Figure 16:
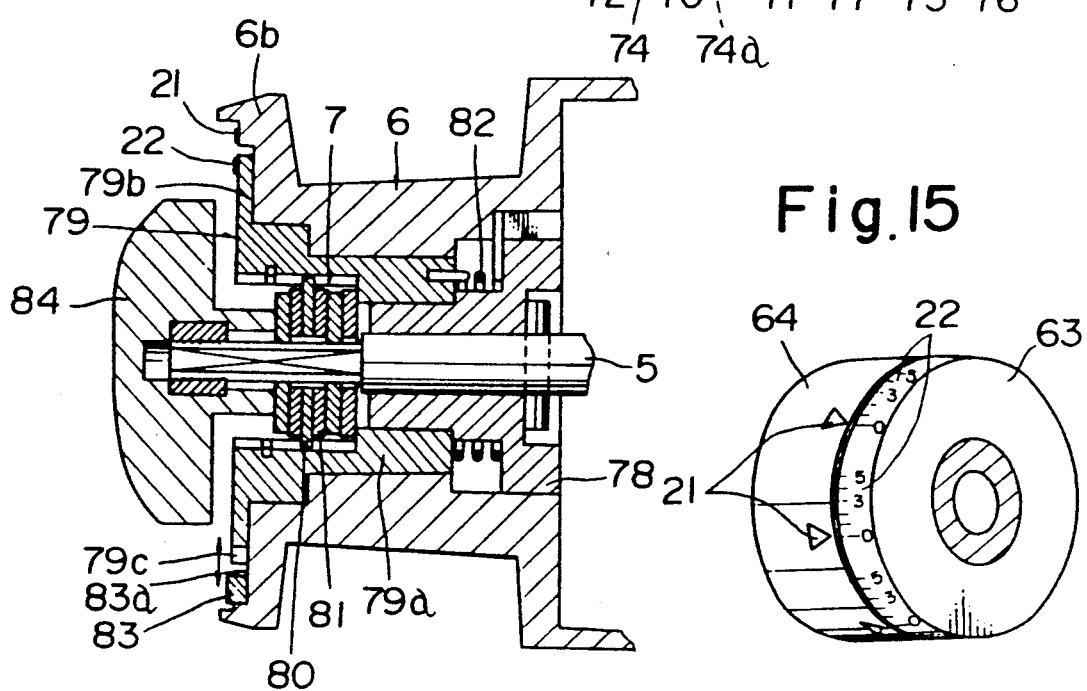
FIG. 16 is a longitudinal sectional view of an eighth embodiment of the invention, showing a part including a spool.

Alternatively, drag mechanism 7 may be provided at the front side of reel body 1 as shown in FIG. 16.

In an eighth embodiment shown in FIG. 16, a spool holder 78 is supported non-rotatably relative to the front end portion of spool shaft 5 which is non-rotatably and axially movably supported with respect to the reel body. Spool 6 is supported rotatably to the outer periphery at the rear portion of spool holder 78, and a drag cylinder 79, which has a cylinder 79a inserted into the inner periphery of spool 6 and a flange 79b extending radially outwardly from one end of cylinder 79a, is rotatably supported to the outer periphery at the front end portion of spool holder 78. Between the inner surface of drag cylinder 79 and a spool shaft 5 is provided a drag mechanism 7 provided with a drag member 80 engageable with drag cylinder 79 and drag members 81 engageable with spool shaft 5, thereby exerting the braking action against rotation of drag cylinder 79. Also, an elastic member 82 is interposed between spool 6 and drag cylinder 79 so that the rotation of spool 6 is transmitted thereto through elastic member 82, and a scale display 22 is provided at the surface of flange 79b at drag cylinder 79. A pointer 21 is provided at the front surface of front flange 6b at spool 6.

A plurality of enaging recesses 79c are circumferentially provided at the outer periphery of flange 79b at drag cylinder 79 and spaced at predetermined intervals. A lock member 83 having an engaging projection 83a engageable with one of engaging recesses 79c is supported radially slidably to the front surface of flange 6b of spool 6. Lock member 83 is operated to engage engaging projection 83a with engaging recess 79c, thereby restraining spool 6 from rotation with respect to drag cylinder 79. In addition, in FIG. 16, reference numeral 84 designates an adjuster screwing with the utmost end of spool shaft 5. Adjuster 84 is rotated to bring drag members 80 and 81 into press contact with each other to thereby exert the braking action on drag cylinder 79.

In addition, in an embodiment in which drag mechanism 7 is provided at the front of reel body 1, spool 6 may alternatively serve as the member subjected to the braking action and the rotary member rotatable with respect to spool 6 may separately be provided.

Also, in the above-described embodiments, alternatively scale display 22 may be provided at the rotary member and pointer 21 may be provided at the member subjected to the braking action.

Alternatively, the elastic member in the above-described braking force measuring mechanism may use a coil spring as shown in FIG. 17.

In detail, in a ninth embodiment shown in FIG. 17, a rotary member 85 is supported rotatably to a spool 6 which is non-rotatably supported relative to a spool shaft. Between rotary member 85 and spool 6 a cam body 86 is provided. Cam body 86 is axially movable and has a cam face 86a, with rotary member 85 being provided with a cam face 85a corresponding to cam face 86a of cam body 86. An elastic member 87 formed of a compression spring is interposed between cam body 86 and spool 6, so that rotary member 85 is rotated to change an engaging position of cam face 85a with cam face 86a and to axially move cam body 86 so as to compress elastic member 87. Hence, when contact resistances between elastic member 87 and spool 6 and cam body 86 become larger than a force equivalent to the braking force set by the drag mechanism, spool 6 leads to rotation together with rotary member 85.

In an embodiment employing cam body 86, as shown in FIG. 18, a rotary member 88 having a cam face 88a may be disposed rotatably and axially movably with respect to spool 6. A cam body 89 having a cam face 89a may be provided between rotary member 88 and spool 6, and an elastic member 90 of a compression spring may be interposed between spool 6 and rotary member 88, so that rotary member 88 may be rotatably operated to be axially shifted, thereby reading an axial displacement thereof, to check the braking force.

Position specifying member 17 in the first embodiment in FIG. 1 need not necessarily be changed in position with respect to adjuster 14. In another embodiment, member 17 may be constructed as shown in, for example, FIGS. 19 to 21.

Figure 21:
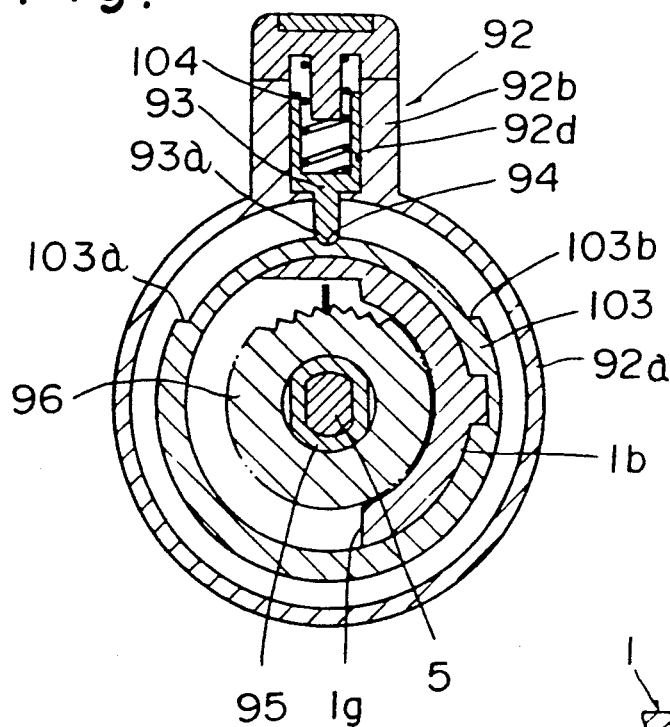
FIG. 21 is a sectional view taken along line XXI—XXI in FIG. 20.

A tenth embodiment shown in FIGS. 19 through 21 is provided with a first adjuster 91 for adjusting the braking force to be applied to spool 6 and a second adjuster 92 separate from first adjuster 91 for adjusting the braking force to be applied to the same, with second adjuster 92 being provided with a position specifying member 93, and with a reference portion 94 corresponding to the position specifying member 93, being provided at a support cylinder 1b at the reel body 1.

In greater detail, support cylinder 1b is divided therein from a front chamber 1e and a rear chamber 1f through a partition 1d. A rotary cylinder 95 is disposed in the front and rear chambers 1e and 1f, and a drag member 96 at the rotary cylinder 95 side and drag members 97 at the support cylinder 1b side are provided in front chamber 1e. A drag member 98 at the rotary cylinder 95 side and drag members 99 at the support cylinder 1b side are provided in rear chamber 1f. First adjuster 91 screws with a threaded screw at the fore end of support cylinder 1b. A pusher 100 is position-adjustably mounted to first adjuster 91, and a drag spring 101 is interposed between pusher 100 and drag members 98 and 99 in rear chamber 1f, so that first adjuster 91 is rotatably operated to bring drag members 98 and 99 at rear chamber 1f into press contact with each other, thereby adjusting the reference braking force to be applied to spool 6. On the other hand, at the root portion of support cylinder 1b is provided a window 1g open at the front chamber 1e, and a pusher 102 having a retainer 102a projecting outwardly through window 1g is attached to drag member 97 in front chamber 1e. Second adjuster 92 screws with the threaded screw at support cylinder 1b, and comprises a cylinder 92a and a lever 92b extending radically outwardly from one side of cylinder 92a. Cylinder 92a is provided with an engaging portion 92c engageable with retainer 102a and pusher 102 couples with second adjuster 92 so that the axial movement of second adjuster 92 caused by rotation thereof is transmitted to drag members 96 and 97 through engaging portion 92c and retainer 102a and drag members 96 and 97 are moved axially forward in the range of window 1g to bring drag members 96 and 97 in press-contact with each other, thereby adjusting the reference braking force set by first adjuster 91. As shown in FIG. 20, an annular member 103 having a recess is mounted on the outer periphery of the base of support cylinder 1b non-rotatably relative thereto, with the recess being used as reference portion 94. Lever 92b at second adjuster 92 is provided with a holding bore 92d extending lengthwise of lever 92b. Position specifying member 93 has at its utmost end a position specifying portion 93a and is slidably supported in holding bore 92d. A compression spring 104 for biasing position specifying member 93 in the direction of engaging with reference portion 94 is provided in holding bore 92b, so that position specifying portion 93a engages with reference portion 94, thereby enabling second adjuster 92 to be specified in the reference position where the reference braking force is obtained. Also, first and second regulation portions 103a and 103b are provided at annular member 103 mounted on support cylinder 1b for regulating a range of adjustment by second adjuster 92. Regulation portions 103a and 103b are provided at both sides of the operating direction of adjuster 92 with respect to reference portion 94 and spaced at equal intervals therefrom, as shown in FIG. 21.

In FIGS. 19 to 21, in the condition in which position specifying portion 93a of second adjuster 92 preengages with reference portion 94, first adjuster 91 is rotated to preset the optimum braking force applied by drag mechanism 7 corresponding to the target fish. Second adjuster 92 is rotated to adjust the preset braking force of first adjuster 91 corresponding to a load applied to the fishing line during fishing, in which second adjuster 92 is rotated toward first regulation portion 103a to decrease the preset optimum braking force and rotated to a maximum extent toward regulation portion 103a to decrease the optimum braking force to a minimum. Also, second adjuster 92 is rotated toward second regulation portion 103b to increase the preset optimum braking force and further rotated to a maximum extent toward portion 103b to increase the braking force to a maximum. Accordingly, the braking force is not too small or too large and there is no risk that the fishing line will be cut due to the braking force preset by the first adjuster 91 thus resulting in efficient fishing.

After fishing, second adjuster 92 is returned to the position at which position specifying portion 93a coincides with reference portion 94, thereby being put in the accurate reference position at which the optimum braking force is obtained.

Since position specifying member 93 is biased by compression spring 104 in the direction of engaging with reference portion 94, an angler can readily check whether second adjuster 92 is positioned accurately in the reference position by virtue of a clicking feel caused when second adjuster 92 rotates to engage position specifying member 93 with reference portion 94. Also, second adjuster 92 can accurately and reliably be placed in the reference position.

Figure 22:
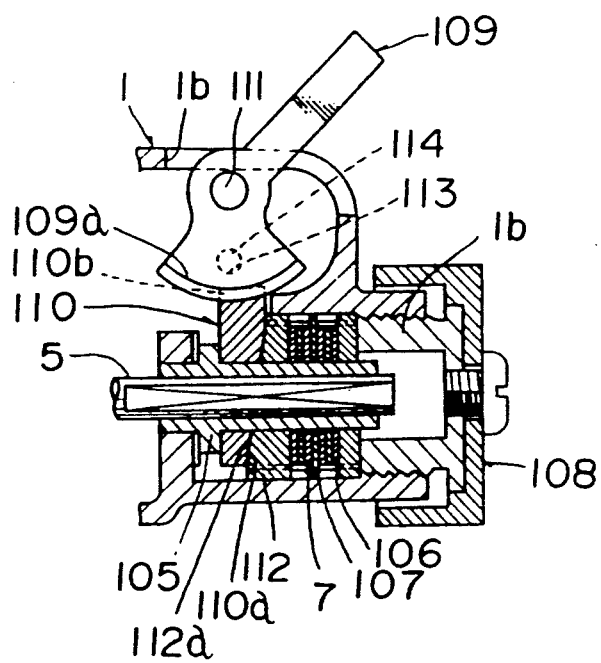
FIG. 22 is a longitudinal sectional view of an eleventh embodiment of the invention, corresponding to FIG. 20.
Figure 23:
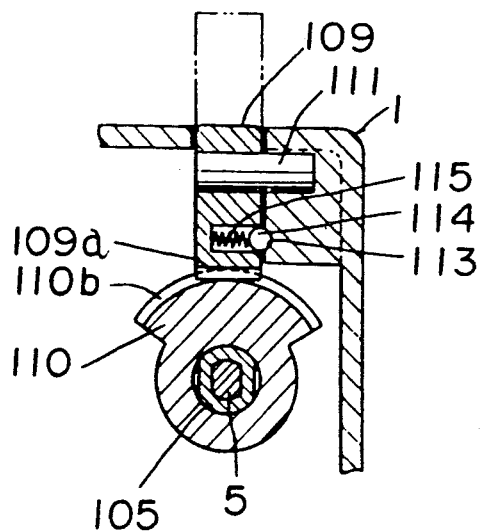
FIG. 23 is a sectional view of an adjuster and a cam body in FIG. 22.

An eleventh embodiment shown in FIGS. 22 and 23 is provided in a support cylinder 1b connected to the reel body 1 with drag members 106 at the rotary cylinder 105 side and a drag member 107 at the support cylinder 1b side. A setting member 108 for setting the minimum braking force screws with the rear portion of support cylinder 1b, and an adjuster 109 is provided at the front thereof. A cam body 110 is provided between adjuster 109 and drag members 106 and 107, with adjuster 109 being inserted into reel body 1 through a window 1h provided at the upper wall thereof and swingably pivoted to one side wall of reel body 1 through a pivot pin 111.

Adjuster 109 is a lever-shaped and has an inner end formed in a circular arc shape extending in the swinging direction. A first slanted tooth 109a for transmitting the swinging motion of adjuster 109 to cam body 110 is provided at the inner end formed in a circular arc.

Cam body 110 is substantially ring-shaped, has at one side surface a cam force 110a slanted with respect to the cam axis, is supported rotatably onto the outer periphery of rotary cylinder 105, and is provided at the outer periphery of cam body 110 with a second slanted tooth 110b. Slanted teeth 109a and 110b engage with each other to associate cam body 110 with adjuster 109.

Between cam body 110 and drag member 107 opposite to cam face 110a is provided an association member 112 which is axially movable only. A cam face 112a in contact with cam face 110a is provided at one side surface of association member 112. Adjuster 109 is operated to rotate cam body 110, thereby axially moving drag members 106 and 107 through association member 112.

Between adjuster 109 and reel body 1 are provided a reference portion 113 formed of a recess and a position specifying member 114 formed of a ball biased by a spring 115 as shown in FIG. 23.

Alternatively, the drag members in the above embodiments may, as shown in a twelfth embodiment in FIGS. 24 and 25, be formed of cylindrical drag member 116 at the spool shaft 5 side and a drag member 117 at the support cylinder side having a substantially C-like shape winding around the outer periphery of drag member 116. In this embodiment, as shown in FIG. 25, first and second bent ends 117a and 117b are provided at drag member 117, and a first adjuster 118 formed of a screw bolt to abut against one bent end 117a is screwably mounted to one side wall of reel body 1. A second adjuster 120 is pivoted across both side walls of reel body 1 through a cam shaft 119 having a cam face 119a abutting against the other bent end 117b, so that first adjuster 118 is rotated to set the optimum braking force of the drag members, with second adjuster 120 being rotated to increase or decrease the braking force.

Also, between second adjuster 120 and reel body 1 are provided a reference portion 121 formed of a recess and a position specifying member 123 formed of a ball.

Drag mechanism 7, when provided at the front side of reel body 1 as shown in the eighth embodiment in FIG. 16, may alternatively be constructed as shown in FIGS. 26 and 27.

In a thirteenth embodiment shown in FIGS. 26 and 27, a spool 6 is rotatably supported onto the fore end portion of a spool shaft 5 supported non-rotatably but axially movably relative to reel body 1. A rotary member 124 is rotatably supported to the rear of spool 6 the same in the third and fourth embodiments shown in FIGS. 6 and 7. Between spool 6 and rotary member 124 is provided an elastic member 125 for biasing spool 6 in the direction of drawing out the line. A pointer 21 is provided at the outer periphery of rotary member 124, and a scale display 22 is provided at the outer periphery of spool 6. A cavity 6g is provided at the front end surface of spool 6, and between the inner periphery of cavity 6g and the outer periphery of spool shaft 5 are provided drag members 126 at the spool side and drag members 127 at the spool shaft side. A setting member 128 for setting the minimum braking force screws with the front end of spool shaft 5 projecting from spool 6. Between setting member 128 and drag member 127 is rotatably provided an adjuster 129, and a disc-like transmitting member 130 for transmitting through adjuster 129 the braking force set by setting member 128 to drag members 126 and 127 is supported non-rotatably and axially movable relative to spool shaft 5. Between the opposite surfaces of adjuster 129 and transmitting member 130 are provided at a phase difference of 180° two sets of first and second cam faces 129a and 130a which are circumferentially rotatable and axially displaceable, so that adjuster 129 is rotated to change the engaging position of cam faces 129a and 130a, thereby adjusting the braking force set by setting member 128. A reference portion 131 is provided at the outer periphery of transmitting member 130, and a position specifying member 132 having a position specifying portion 132a is movably supported to the outer periphery of adjuster 129. Position specifying member 132 is biased by a compression spring 133 toward reference portion 131. Position specifying portion 132a engages with reference portion 131 to put adjuster 129 in the reference position where the optimum braking force is obtained, so that adjuster 129 is rotated with respect to the reference position, thereby adjusting the preset braking force.

Reference portion 131 and position specifying portion 132a are provided at an intermediate position of the high level and low level faces between cam faces 129a and 130a. Adjuster 129 comprises a boss 129b having at its center a round through bore into which spool shaft 5 is inserted, a contact surface in contact with a drag member 127, and a cavity; and an operating portion 129c extending radially outwardly from boss 129b. Cam face 129a is provided at the edge of the opening of the cavity, and an operating knob 134 is mounted at the outside of adjuster 129 through a screw 135. Transmitting member 130 comprises a boss 130b having at its center a non-round through bore into which spool shaft 5 is inserted and a disc 130c. Cam face 130a is provided at the axially inside surface of disc 130c.

In the thirteenth embodiment in FIGS. 26 and 27, when setting member 128 is rotated, transmitting member 130 and adjuster 129 move axially with respect to spool shaft 5 so as to press drag members 126 and 127. When adjuster 129 is rotated, the engaging position between cam faces 129a and 130a sequentially changes, so that adjuster 129 moves axially with respect to spool shaft 5 to increase or decrease the braking force. In addition, in FIG. 26, reference numerals 136 and 137 designate regulation portions to regulate a rotation range of rotary member 124 with respect to spool 6, and reference numeral 138 designates an engaging portion engageable with one regulation portion 136 to 137.

Alternatively, in FIGS. 19 to 27, the position specifying portions may be provided at the setting member and adjuster, and the reference portion corresponding to each position specifying portion may be provided at the reel body so that the first adjuster may be placed in the reference position at which the optimum braking force is always obtainable and also the adjuster may be placed in the reference position where the braking force set by the first adjuster is obtainable. In this case, the position specifying portion provided at the first adjuster, as shown in the embodiments in FIGS. 19 through 27, may be non-changeable in position or changeable as in the FIG. 1 embodiment.

The elastic member at the braking force measuring mechanism of the invention preferably employs a coil spring, but its structure is not particularly limited.

Also, the reference portion and position specifying portion at the reference position measuring mechanism may be provided reversely to the adjuster and reel body respectively. Alternatively, the reference portion and position specifying portion may not engage but instead coincide with each other.

Also, the present invention is applicable to any other type of fishing reel as well as the spinning reel.

As seen from the above, the spinning reel of the invention is provided with (1) a braking force measuring mechanism provided with an elastic member interposed between a member subjected to braking action by the drag mechanism and the rotary member, a pointer provided at one of the member subjected to the braking action and the rotary member, and a display provided at the other of the member subjected to the braking action and the rotary member, with the display corresponding in position to the pointer and displaying the braking force applied by the drag mechanism; and (2) a reference position setting mechanism provided with a reference portion for setting the reference position of the adjuster and a position specifying portion for specifying the position of the adjuster; whereby the rotary member is rotated against the elastic member to increase its elastic restoring force to a magnitude greater than the braking force applied by the drag mechanism and the member subjected to the braking action rotates together with the rotary member. The display scale coincident with the pointer at the location at which they rotate together is read to enable the braking force of the drag mechanism to be checked and set with accuracy. Furthermore, after the braking forces checked, the reference portion coincides with the position specifying portion so that the adjuster desirably adjusts the braking force for fishing. Also, the adjuster is returned to the position of the reference portion coincident with the position specifying portion, thereby being placed in the reference position simply and accurately.

Although several embodiments have been described, they are exemplary of the invention and not to be construed as limiting, the invention being defined solely by the appended claims.

What is claimed is:

1. A spinning reel including:
   a reel body;
   a spool rotatably supported to said reel body;
   a spool shaft carrying said spool;
   a rotary frame rotatably supported to said reel body and for winding a fishing line onto said spool;
   a drag mechanism for applying a braking force against rotation of said spool, said drag mechanism comprising an adjuster for adjusting said braking force;
   a support member on which said adjuster is supported such that said adjuster can be adjusted in position relative to said support member, said support member including a portion which extends away from one side of said adjuster;
   a braking force measuring mechanism for measuring said braking force applied by said drag mechanism, said measuring mechanism comprising (a) an elastic member interposed between (i) a braking force acting member subjected to said braking force applied by said drag mechanism and (ii) a rotary member rotatable with respect to said braking force acting member, a pointer provided at one of said braking force acting member and said rotary member, and (c) a display portion provided at the other of said braking force acting member and said rotary member, said display portion for displaying an indication of said braking force applied by said drag mechanism represented by a position of said pointer;
   a reference position setting mechanism for setting a user selectable reference position indicating an optimum braking force applied by said drag mechanism as adjusted by said adjuster, said reference position setting mechanism comprising a reference portion for setting said reference position and a position specifying member, said reference portion being non-rotatable with respect to said support member for said adjuster, said position specifying member being located at said one side of said adjuster and including a position specifying portion for specifying a position of said adjuster corresponding to said reference portion, said position specifying member being supported such that in a first mode it is operable to move together with said adjuster when said adjuster is moved to adjust said braking force and in a second mode it is movable relative to said adjuster to alter its position with respect to said adjuster, whereby said adjuster is able to be accurately positioned at a position to achieve said optimum braking force, said reference portion and said position specifying member in said first mode being movable past one another when said adjuster is moved to adjust said braking force such that in said first mode said adjuster can adjust said braking force both up and down relative to said optimum braking force;
   wherein said spinning reel has a spool shaft side and a reel body side, and wherein said drag mechanism is provided with a drag member at the spool shaft side and a drag member at the reel body side, said spool shaft being subjected to said braking force applied by said drag mechanism, said spool being supported to be rotatable relative to said spool shaft, said elastic member being interposed between said spool shaft and said spool;
   wherein said spool shaft supports a spool holder to be non-rotatable relative thereto, said spool holder supporting said spool to be rotatable relative thereto, said elastic member being interposed between said spool holder and said spool; and
   further comprising a lock means provided between said spool and said spool holder for locking rotation of said spool with respect to said spool holder.

* * * * *